United States Patent [19]

Tanaka et al.

[11] Patent Number: 4,507,204
[45] Date of Patent: Mar. 26, 1985

[54] WATER-REMOVING MATERIAL USABLE FOR HYDROPHOBIC LIQUIDS AND PROCESS FOR PRODUCING THE SAME

[75] Inventors: Koji Tanaka; Minoru Ueda, both of Okayama, Japan

[73] Assignee: Japan Exlan Company Limited, Osaka, Japan

[21] Appl. No.: 351,363

[22] Filed: Feb. 23, 1982

Related U.S. Application Data

[63] Continuation of Ser. No. 116,781, Jan. 30, 1980, abandoned.

[30] Foreign Application Priority Data

Feb. 12, 1979 [JP] Japan .................................. 54-15786
Jun. 29, 1979 [JP] Japan .................................. 54-83002
Jul. 23, 1979 [JP] Japan .................................. 54-94077

[51] Int. Cl.$^3$ .............................................. B01D 39/16
[52] U.S. Cl. ......................... 210/497.01; 210/DIG. 5
[58] Field of Search ............. 210/DIG. 5, 489, 497.1, 210/497.01; 264/182; 128/334 R

[56] References Cited

U.S. PATENT DOCUMENTS

| | | | |
|---|---|---|---|
| 3,158,532 | 11/1964 | Pall et al. | 210/505 |
| 3,460,680 | 8/1969 | Domnick | 210/489 |
| 4,107,121 | 8/1978 | Stoy | 264/182 X |
| 4,183,884 | 1/1980 | Wichterle et al. | 264/182 X |

*Primary Examiner*—Frank Spear
*Attorney, Agent, or Firm*—Wenderoth, Lind & Ponack

[57] ABSTRACT

A water-removing material usable for hydrophobic liquids consisting of a fiber assemblage containing water-swellable fibers, at least a part of the fiber outer layer of which is composed of a hydrophilic, cross-linked polymer and the remainder of which is composed of an acrylonitrile polymer and/or another polymer; and a water-removing filter formed into the shape of a tube by winding said fiber assemblage around an internal tubular support, or by compressing said fiber assemblage into the shape of a tube.

12 Claims, No Drawings

WATER-REMOVING MATERIAL USABLE FOR HYDROPHOBIC LIQUIDS AND PROCESS FOR PRODUCING THE SAME

This application is a continuation of Ser. No. 116,781, filed Jan. 30, 1980, now abandoned.

BACKGROUND OF THE INVENTION

1. Field of the Invention

The present invention relates to a water-removing material usable for hydrophobic liquids consisting of a fiber assemblage containing water-swellable fibers. At least a part of the fiber outer layer is composed of a hydrophilic, cross-linked polymer (hereinafter referred to as hydrogel) and the remainder is composed of an acrylonitrile polymer (hereinafter referred to as AN polymer) and/or another polymer. The invention also relates to a water-removing filter formed into the shape of a tube by winding said fiber assemblage around an internal tubular support, or by compressing said fiber assemblage into the shape of a tube.

2. Description of the Prior Art

In recent years, polymers having a high degree of water-swellability and water-insolubility (hydrogels) have been used in a wide field of applications because of their particular functions. For example, attempts have been made on applications to diapers, sanitary products, etc. by utilizing the instantaneous high water-absorbing power of these polymers; applications to soil-improving materials, instant sandbags, etc. by utilizing their high water-retentive capacity; or applications to soft contact lenses, artificial internal organs, surgical seaming materials, etc. on account of their intimate affinity to human tissues, and among these applications some are already entering a practical stage.

On the other hand, there is a strong demand for removing water contained in hydrophobic liquids such as organic solvents, lubricating oils, etc. to reuse such liquids or to prolong their useful life. For this purpose, granular products of inorganic salts such as silica gel, zeolite, etc. are used in some cases. Although it is possible to remove water to some extent by such inorganic salts, their water removing power is extremely low. In addition, such salts involve an intrinsic defect of remaining in the liquids after purification in slight quantities, and therefore their fields of use had to be limited. Also, the use of fibers produced from natural pulp, etc. having some degree of moisture- or water-absorbing properties is attempted in some cases, but their water-removing ability is extremely low and they are lacking in practical usability.

In such a situation, we paid attention to the instantaneous high water-absorbing power of said water-swellable polymers (hydrogels), and attempted to determine if it is possible to utilize them as a water-removing material for the above-mentioned hydrophobic liquids. However, in the case of using a hydrogel in the form of granules, they absorbed water and swelled instantaneously due to their excellent water-absorbing power, and clogged the interspaces or gaps among the granules. Therefore, we had to stop the water-removing treatment after a very short time. To avoid such gap clogging, we tried to use a hydrogel in fiber form, and found that it was possible to prolong the time of the water-removing treatment to some degree in comparison with granular hydrogels. But, by reason of swelling and deterioration of the fibers, we were not able to solve the problem of gap clogging and therefore it was impossible to cause such a fiber form hydrogel to exhibit its water-absorbing power.

STATEMENT OF THE INVENTION

Under such circumstances, we researched intensively to solve the above-mentioned problem. As a result we found that, by using, as the water-removing material for hydrophobic liquids, a single element of water-swellable fibers having a multiple phase structure composed of an outer layer of a hydrogel and an inner layer of an AN (acrylonitrile) polymer and/or another polymer, or a compounded product of said fibers with other fibers, it is possible to carry out the water-removing treatment for a long time without deterioration of the fibers, so that the water-absorbing power of the hydrogel can be sufficiently exhibited.

Also, we found that by using a filter composed of a fiber assemblage containing said water-swellable fibers, and formed into a tubular shape, it is possible to continue the water-removing treatment operation for a long time, without the problem of by-pass flow caused by density unevenness in lengthwise directions of the tube, and without deterioration of the fibers, so that the water-absorbing power of the hydrogel can be sufficiently exhibited.

Furthermore, we found that, by compressing into the form of a tube, a fiber assemblage containing latently water-swellable fibers, wherein at least a part of the fiber outer layer is composed of a hydrogel and the remainder is composed of an AN polymer and/or another polymer, and which contain, combined therewith, carboxyl groups of which at least a part is acid type carboxyl groups (—COOH), in an amount of 0.1 to 4.0 m mol/g, and by neutralizing the fibers in a non-swollen state and drying the fibers, it is possible to obtain a tubular filter which does not necessitate any support (such as an internal tube) or adhesive, and which is easily handled, such as in mounting, exchanging, etc.

Moreover, we found that, by using this type of filter, it is possible to continue the water-removing treatment operation for a long time without any deterioration of the fibers or occurrence of gap clogging problem, so that the water-absorbing power of the hydrogel can be fully displayed.

The present invention is based on these discoveries.

Therefore, the principal object of the present invention is to provide a novel water-removing material for hydrophobic liquids, which has an excellent water-removing power.

Another object of the present invention is to provide an industrially or economically advantageous water-removing material for hydrophobic liquids which does not cause concern for the possible mixing of the water-removing material in purified liquids after the water-removing treatment operation, as in the case of granular inorganic salts, and which can be used for a long time without deterioration or gap clogging.

A further object of the present invention is to provide a water-removing filter which has no density unevenness in lengthwise directions of the tube, and which can be adjusted at will for the winding density and thickness of the tube.

A still further object of the present invention is to provide a process which makes it possible to produce, in an industrially advantageous manner, a tubular water-removing filter having an optional density, without requiring any internal tubular support or adhesive.

Other objects of the present invention will become apparent from the following concrete explanation of the invention.

The above-mentioned objects of the present invention can be advantageously attained by using a single element product of water-swellable fibers, at least a part of the fiber outer layer being composed of a hydrogel and the remainder being composed of an AN polymer and/or another polymer, or a compounded product of said fibers and other fibers.

One type of the water-removing filters according to the present invention for attaining the above-mentioned objects of the present invention is a tubular product produced by winding a fiber assemblage containing the above-mentioned water-swellable fibers around an internal tubular support through which a plurality of perforations have been bored.

Another type of the water-removing filter according to the present invention is produced by compressing into a tubular shape, a fiber assemblage containing said water-swellable fibers, at least a part of the fiber outer layer of which is composed of a hydrogel, and the remainder of which is composed of an AN polymer and/or another polymer, and which contain, combined therewith, salt-type carboxyl groups (—COOX wherein X is an alkali-metal or ammonium) in an amount of 0.1 to 4.0 m mol/g.

The latter type of water-removing filter can be produced advantageously by compressing into a tubular shape, a fiber assemblage containing latently water-swellable fibers, at least a part of the fiber outer layer of which is composed of a hydrogel, and the remainder of which is composed of an AN polymer and/or another polymer, and which contain, combined therewith, carboxyl groups of which at least a part is acid-type carboxyl groups (—COOH), in an amount of 0.1 to 4.0 m mol/g, and neutralising the fibers in a non-swollen state and drying the fibers.

DESCRIPTION OF THE PREFERRED EMBODIMENTS

The expression "water-swellable fibers" according to the present invention is a generic term for fibers wherein at least a part of the fiber outer layer is composed of a hydrogel which displays a water-absorbing and water-swelling ability, and the remainder is composed of an AN polymer and/or another polymer which is responsible for the fiber physical properties such as strength, elongation, etc.

The degree of water-swellability of such water-swellable fibers desirably falls within the range between 2 and 350 cc/g, and more desirably between 2 and 200 cc/g. If the degree of water-swellability is less than the lower limit of the recommended range of the present invention, the water-removing ability will be insufficient, and if it exceeds said upper limit, it will be impossible to avoid the problems of deterioration, gap clogging, etc. which hinder the water-removing treatment operation from continuing for a long time.

The proportion of the hydrogel layer based on said fibers should be determined in relation to the balance between the water-swellability and physical properties of the fibers, and therefore it is impossible to prescribe it definitely. However, it is desirable that the proportion should be generally not larger than 55% and preferably should be within the range between 5 and 40%, based on the total volume of the fibers in the dry state. The degree of water swellability of the fibers is also influenced by the density of cross-linkage, and is not controlled only by the amount of salt-type carboxyl groups represented by the formula —COOX (wherein X is an alkali-metal or ammonium). However, AN fibers containing the salt-type carboxyl groups in an amount generally within the range of from 0.1 to 4.0 m mol/g, preferably from 0.2 to 3.5 m mol/g, are desirable from the viewpoint of water-swellability, fiber physical properties, flexibility, etc. Of course, the carboxyl groups are not required to be of 100% salt-type, and acid-type carboxyl groups (—COOH) may also be present so long as fibers having a prescribed degree of water-swellability can be obtained.

When AN fibers having visualized or latent crimps are used as the starting material, it is possible to produce water-swellable fibers having crimps. Such water-swellable fibers having crimps are desirable because the use of such fibers markedly improves the resilience, deterioration, etc. of the fibers. As AN fibers having such visualized or latent crimps, there can be mentioned mechanically crimped fibers and self-crimping fibers such as fibers of bicomponent conjugated type, random composite type, eccentric sheath-core type, etc. The self-crimping fibers can be used after visualization of crimps by heat-treatment, etc., or after visualization of crimps, followed by elimination of crimps by heat-stretching, etc.; or without visualization of crimps. As regards the crimping characteristics of such water-swellable fibers having crimps, these are not limited so far as the fibers have crimps. However, from the viewpoint of the processability including spinnability as in the usual textile fibers, or of the improvement in various properties such as the resilience of the final products, the deterioration of the fibers, etc. it is desirable that the fibers should have a crimp number (Cn) of 30 or less, preferably from 4 to 25, and a crimp index (Ci) of 40% or less, preferably within the range of from 5 to 30%.

As used herein the term "AN polymers" is a generic term for polymers containing AN in an amount of more than 30 weight %, preferably more than 50%, and as such AN polymers there can be mentioned AN homopolymer, copolymers of AN and at least one other ethylenically unsaturated compound, or graft copolymers of AN with other polymers such as starch, polyvinyl alcohol, etc. However, so far as the above-mentioned AN content is satisfied, mixed polymers composed of an AN polymer and another or other polymers such as polyvinyl chloride, polyamide, polyolefin, polystyrene, polyvinyl alcohol, cellulose, etc. can be used.

Such water-swellable fibers according to the present invention can be employed without any restrictions so far as said fibers have the above-mentioned multiple layer structure. As an industrially advantageous process which makes it possible to produce water-swellable fibers containing a hydrogel layer having a desired water-swellability, without using a polymer having a particular composition derived from a cross-linkable monomer as the starting material, also without subjecting the fibers to a cross-linking treatment, and only by a hydrolytic treatment, the following means, for example, can be employed.

Namely, there is employed either a process (hereinafter referred to as A process) in which an aqueous solution of an alkali-metal hydroxide of a high concentration not less than 6.0 mol/1000 g solution is caused to act on the AN fibers, or another process (hereinafter referred to as B process) in which an aqueous solution of an alkali-metal hydroxide of a low concentration, coexisting with an electrolytic salt of a concentration not less than 0.5 mol/1000 g solution, is caused to act on the AN fibers.

Upon employing the A process, if an aqueous alkaline solution of a concentration less than 6.0 mol/1000 g solution is used, the AN fibers are made hydrophilic by the hydrolytic reaction but become water-soluble, and it is impossible to form a hydrogel outer layer to which the present invention is directed. The present invention can be more effectively realized by using an aqueous alkaline solution in the range of concentration of from 6.25 to 8.85 mol/1000 g solution, preferably from 6.25 to 8.50 mol/1000 g solution. Under conditions exceeding the upper limit of the preferred range, the activity of the alkali-metal hydroxide is lowered, so that in order to increase the reaction rate, a high-temperature treatment is required, and also the treatment for the removal of remaining alkali then becomes difficult. Therefore, such conditions are not desirable from the viewpoint of practical use.

Upon employing the B process, if the coexisting salt is of a low concentration less than 0.5 mol/1000 g solution, the AN fibers are made hydrophilic by the hydrolytic reaction, but most of the fibers become water-soluble, and therefore it is impossible to form a hydrogel outer layer portion in one step using an aqueous alkaline solution of a low concentration. The present invention can be more advantageously practiced industrially by using an aqueous solution of an alkali-metal hydroxide of a concentration of from 0.25 to 6.0 mol/1000 g solution, preferably 0.5 to 5.0 mol/1000 g solution, containing an electrolytic salt of a concentration of 1.0 mol/1000 g solution or higher.

The alkali-layer hydroxides used in the present invention include hydroxides of alkali-metals such as Na, K, Li, etc. and mixtures of such hydroxides. As the electrolytic salts, any salts can be used so far as they are stable under the alkali treatment condition. Such salts include those salts whose cationic component is an alkali-metal (such as Na, K, Li, etc.) or an alkali-earth metal (such as Be, Mg, Fe, Co, Ni, etc.) or $NH_4$, and whose anionic component is an acid radical (such as hydrochloride, sulfate, nitrate, chromate, dichromate, chlorate, hypochlorite, organic carboxylate, organic sulfonate, etc.) and mixtures of two or more these salts. When an electrolytic salt whose cationic component is a divalent or higher valent element is used, the components of the resulting hydrogel outer layer are liable to agglomerate or unite with each other, and furthermore the degree of water-swellability is lowered. Therefore, it is preferable to use a salt whose cationic component is an alkali-metal. As solvents to replace water, aqueous mixed solvents composed of water and water-miscible organic solvents such as methanol, ethanol, 2-methoxyethanol, dimethylformamide, dimethyl sulfoxide, etc. can be used so far as such mixed solvents do not dissolve the AN fibers being treated. If necessary, it is possible to add other organic or inorganic substances.

It is difficult to definitely state the temperature and/or time period for treating the AN fibers with an aqueous alkaline solution as mentioned above. However, by causing the solution to act on the AN fibers at a temperature higher than 50° C., preferably higher than 80° C., for a time less than 40 minutes, preferably less than 30 minutes, only the outer layer of the fibers can be easily hydrogelled even in the case of using AN fibers composed of an AN polymer monocomponent.

As the AN fibers to be treated with the aqueous alkaline solution, any fibers can be employed so far as they have a cross-sectional structure in which at least a part of the surface of the fibers is composed of the AN polymer. Such fibers can be voluntarily selected from monocomponent-spun fibers, composite-spun fibers, etc. From the industrial viewpoint, the AN fibers employed in the present invention are preferably AN polymer monocomponent fibers. However, it does not deviate from the spirit of the present invention to use, as starting materials, composite fibers from an AN polymer and at least one other polymer (for example, polyvinyl chloride, polyamide, polyolefin, polystyrene, cellulose, etc.), of the sheath-core type, random composite type, "sea-islands" type, bicomponent conjugated type, sandwich type, etc.

The AN fibers thus obtained are subjected to the abovementioned hydrolytic treatment to produce water-swellable fibers wherein at least a part of the fiber outer layer is composed of a hydrogel, and the remainder is composed of an AN polymer and/or another polymer, preferably water-swellable fibers having a two phase structure composed of a hydrogel outer layer and an AN polymer inner layer, and most desirably those having crimps. As required, such fibers can take the form of short fibers, long fibers, woven or knitted fabrics, non-woven fabrics, etc.

When such water-swellable fibers are used singly or in combination with other fibers as a water-removing material for hydrophobic liquids, it is desirable that the fibers should be a fiber assemblage having a degree of water-swellability of 1–200 cc/g, preferably 2–100 cc/g. If the degree of water swellability of such a fiber assemblage is less than the lower limit of the recommended range of the present invention, the water-removing power will be insufficient, and if the degree of water-swellability exceeds the upper limit, it is impossible to avoid the problems of the deterioration of the fibers and the clogging of gaps among the fibers, so that the continuation of the water-removing treatment operation for a long time becomes impossible.

As the other fibers which may be mixed with the water-swellable fibers, there can be mentioned natural fibers such as cotton, wool, etc.; semi-synthetic fibers such as rayon, cupra, etc.; synthetic fibers such as polyvinyl alcohol fibers, polyvinyl chloride fibers, polyamide fibers, polyester fibers, polyacrylonitrile fibers, etc. The mixing ratio of such fibers can be suitably selected in consideration of the degree of water-swellability of the water-swellable fibers, water-removing power of the final product, etc. and therefore it is difficult to prescribe it definitely. However, it is desirable to use said other fibers in a ratio generally less than 95 weight %.

PRODUCTION OF WATER-REMOVING FILTERS

1. Winding Method

In the following, we shall mention the method of producing a water-removing tubular filter by winding a fiber assemblage containing the water-swellable fibers around an internal tubular support.

The fiber assemblages to be wound around an internal tubular support include those in the form of yarns, webs, woven fabrics, knitted fabrics, etc. and they mean not only products composed singly of water-swellable fibers and mixed products of said fibers with other fibers, but also mixtures of single and/or mixed products containing water-swellable fibers with fiber assemblages composed singly of other fibers. The yarns in the present invention include mono- and multifilaments, and spun yarns of worsted spinning type, staple fiber spinning type, cotton spinning type, woolen spinning type, open-end spinning type, etc.

As regards the form of the fiber assemblages, it is desirable to use those in the form of yarn from the viewpoint of convenience in shaping. The use of the so-called "bulky" yarn is particularly desirable because the resilience, voluminosity, deterioration, etc. of the fibers are markedly improved or corrected, which further brings about a remarkable improvement in the water-removing power of the finally obtained filter. The fiber assemblages containing the water-swellable fibers may be those into which the hydrogel layer has been introduced, not only in the stage of the starting material fibers or fiber assemblage, but also in the form of a filter composed of a fiber assemblage containing fibers that can be hydrogelled.

As regards the shape of the tubular filter formed by winding a fiber assemblage containing the water-swellable fibers of the present invention around an internal tubular support, and the winding density, it is necessary to vary them depending on the kind, viscosity, etc. of the liquid to be treated, and therefore it is difficult to prescribe them definitely. However, it is desirable that the ratio of the diameter to height of the filter should be generally 1:0.5–20, preferably 1:1–10, and the winding density should be generally 0.1–0.6 g/cm$^3$ preferably 0.15–0.4 g/cm$^3$.

On using the filter, the liquid to be treated may be supplied either to the outer surface or to the inner surface of the tube. However, it is preferable to supply the liquid to the outer surface and take out the purified liquid from the inner surface, because this procedure gives a larger surface area of fibers coming into contact with the liquid to be treated, so that the treating efficiency can be increased. Accordingly, the internal tube which is a support for the wound fiber assemblage plays the role of maintaining the shape of the filter during the water-removing treatment. The internal tube must not be corroded or dissolved by the liquid being treated. So far as this requirement is satisfied, the internal tube may be of any thickness and may be made of any material. It is necessary that the internal tube should be equipped with a plurality of perforations through which the liquid under treatment is to pass. Of course, it is desirable that such perforations should be distributed uniformly throughout the entirety of the internal tube so that no inequality in the liquid flow, the passing pressure of the liquid, etc. should be caused. It is desirable that the shape of the tubular water-removing filter according to the present invention should be a hollow cylinder, but if required, the filter may be shaped into a hollow truncated cone by selecting a suitable winding method, shape of the internal tube, etc.

2. Compression method

In the following, we shall explain the method of producing the water-removing filter by compression shaping.

In the first place, the expression "latently water-swellable fibers" according to the present invention containing combined therewith carboxyl groups at least a part of which is acid-type carboxyl groups (—COOH), is a generic term for fibers which can be transformed into the above-mentioned water-swellable fibers by a neutralizing treatment. The latently water-swellable fibers can be advantageously prepared by acid-treating the water-swellable fibers at a prescribed pH, thereby obtaining fibers of which a desired amount of salt-type carboxyl groups has been transformed into acid-type. However, it is also possible to directly produce fibers into which acid-type carboxyl groups have been introduced, by hydrolyzing AN fibers by an acid. As regards the above-mentioned acid treatment, a method may be mentioned wherein the water-swellable fibers are immersed into an aqueous bath having a pH value not higher than 5.5, preferably not higher than 5.0. By using latently water-swellable fibers wherein at least 10 mol % of the total carboxyl groups are acid-type carboxyl groups, the steps of shaping, dehydration, drying, etc. can be carried out in an industrially advantageous manner.

The fiber assemblage containing the water-swellable fibers or latently water-swellable fibers means a product composed singly of the water-swellable fibers or latently water-swellable fibers, or a mixture of such fibers with other fibers. The shape of such a fiber assemblage can be short fibers, long fibers, yarns, woven or knitted fabrics, non-woven fabrics, etc. Among others, it is desirable to use short fibers in opened form because a uniformly compressed product can be produced. Also, by using short fibers having a crimping ability, the deterioration of the fibers and the gap clogging upon using the water-removing filter can be remarkably corrected, so that the useful life of the filter can be markedly prolonged.

As regards the shape of the water-removing filter to be finally obtained, and the packing density, it is necessary to vary them depending on the kind, water content, viscosity, etc. of the liquid to be treated, and therefore it is impossible to prescribe them definitely. However, it is desirable that the ratio of the diameter to height of the tube should be generally 1:0.5–10, and that the packing density should be generally 0.1–0.6 g/cm$^3$, preferably 0.15–0.4 g/cm$^3$. The expression "tubular shape" as used in the present invention means not only a hollow cylinder but also may include a hollow truncated cone, under certain circumstances.

We shall explain how to shape the tubular water-removing filter in further detail.

First, a fiber assemblage containing the above-mentioned latently water-swellable fibers is dehydrated to a water content not higher than 100%, preferably not higher than 50%. If this dehydration is insufficient, the subsequent drying becomes difficult. However, a method may be employed in which an undehydrated fiber assemblage is packed into a shaping vessel and then the fiber assemblage is subjected to dehydration by suction.

Next, a prescribed amount of the fiber assemblage dehydrated to a water content preferably not higher than 100% is charged into a shaping vessel equipped with an inlet and an outlet, and is shaped by compression. By suitably controlling the amount of the fibers to be charged and the compression conditions, it is possible to regulate voluntarily the packing density and shape of the water-removing filter.

The fiber assemblage thus shaped by compression is neutralized and dried in a non-swollen state, without being taken out of the shaping vessel, and while being maintained under compression. By this neutralization, the carboxyl groups are transformed from acid-type to salt-type, and the fibers tend to remarkably swell with water, which makes drying extremely difficult. Therefore, it is necessary to carry out these treatments in a non-swollen state of the fibers. Also, by the compression shaping only, the adhesion among the fibers and the fixation of the filter shape are insufficient, so that it is desirable to neutralize and dry the filter without taking it out of the shaping vessel, while maintaining the filter under compression. Such neutralizing and drying treatments can be performed without any limitation so far as these treatments are carried out in a non-swollen state of the fibers. For example, there may be mentioned a method which comprises introducing a water-miscible and non-swelling solvent containing an alkali such as an alkali-metal hydroxide into the shaping vessel, bringing the fiber assemblage into contact with said solvent to neutralize it, washing the fiber assemblage with said solvent, as required, to remove an excess amount of the alkali, and drying the fiber assemblage with hot air current; and a method which comprises drying the fiber assemblage, and neutralizing it by bringing it into contact with a gas such as ammonia or a lower amine, etc. As the above-mentioned water-miscible, non-swelling solvents, there may be cited lower alcohols such as methanol, ethanol, isopropanol, etc.; acetone, methyl ethyl ketone, dioxane, dimethyl sulfoxide, dimethylformamide, etc. The use of solvents having a low boiling point is desirable because the subsequent drying treatment is easy. Also, it is desirable to use a solvent mixed with an amount of water (for example 30% or less), so far as such a mixed solvent maintains non-swelling properties, because with such a solvent, the neutalizing time can be shortened. Of course, it is not necessary to convert all of the carboxyl groups into salt-type, and acid-type carboxyl groups may coexist.

The hydrophobic liquids to which the water-removing filter of the present invention is applicable include those which assume a liquid form under the water-removing condition, and cause phase separation with water (slight mutual dissolution is permissible so far as phase separation is caused). As such liquids there may be mentioned petroleum hydrocarbons such as petroleum ether, pentane, hexane, heptane, petroleum benzine, etc.; alicyclic saturated hydrocarbons such as cyclohexane, cyclooctane, etc.; aliphatic unsaturated hydrocarbons such as 1-octene, cyclohexene, etc.; aromatic hydrocarbons such as benzene, xylene, styrene, etc.; halogenated aliphatic hydrocarbons such as tetrachloroethylene, methylene chloride, chloroform, carbon tetrachloride, etc.; lubricating oils such as spindle oil, refrigerating machine oil, dynamo oil, turbine oil, machine oil, cylinder oil, marine engine oil, gear oil, hydraulic oil, compresser oil, etc.

Thus, one of the great advantages, worthy of special mention, of the present invention is that, by using a product composed singly of water-swellable fibers having a hydrogel outer layer and an AN polymer, etc. layer, or a mixed product composed of said fibers and other fibers, as the water-removing material for hydrophobic liquids, not only an outstanding water-removing ability is obtained, but also the water-removing treatment can be carried out for a long time, without causing the problems of the deterioration and gap clogging of the filter.

Further marked characteristics of the present invention are that the water-removing material does not get mixed in the purified liquid after water-removing treatment, and the water-removing material can be used in any desired shape or packing density.

The water-swellable fibers which combine such a high degree of water-swellability and excellent fiber physical properties can be used as a water-removing material for hydrophobic liquids, singly or, if desired, as a mixture with existing natural, semi-synthetic, or synthetic fibers, and in a desired form such as short fibers, long fibers, webs, yarns, woven or knitted fabrics, non-woven fabrics, felts, shaped products.

The water-removing tubular filter according to the present invention, produced by winding the water-swellable fibers around an internal tubular support, has various advantages, in that it can be shaped in an industrially advantageous manner, such that it has no density unevenness in lengthwise directions of the tubular filter, and the winding density and the thickness of the filter can be regulated at will, and in that the filter can display an outstanding water-removing power for a long time, without the problems of the deterioration of the fibers, gap clogging, by-pass flow and mixing of the water-removing material into the purified liquid.

Also, by employing the production method by compression according to the present invention, a water-removing filter having a desired shape and packing density, as well as the above-mentioned excellent characteristics, can be produced advantageously in an industrial manner, without using any internal tubular support or adhesive, and without any difficulties in dehydration and drying inherent in water-swellable fibers.

The mounting of the water-removing filters of the present invention on a water-removing apparatus and their exchange are very easy, and therefore the operational advantages are very great. Moreover, it is very important that a way is now opened for the regeneration and reuse of waste liquids which have been heretofore discarded.

For a better understanding of the present invention, examples are set forth in the following, but it is to be understood that the scope of the invention is by no means limited by the description of these examples, in which all percentages and parts are by weight unless otherwise indicated.

The degree of water-swellability and the amount of carboxyl groups are measured and calculated by the following methods:

(1) Degree of water-swellability (cc/g)

About 0.1 gram of sample fibers is immersed in pure water and the water is maintained at 25° C. After 24 hours, the fibers are wrapped in a nylon filter cloth (200 mesh) and the water remaining about the fibers is removed by a centrifuge (3 G×30 minutes, wherein G represents the acceleration of gravity). The weight of the sample fibers thus prepared is measured ($W_1$ g). The sample is then dried in a vacuum drier at 80° C. until it reaches a constant weight ($W_2$ g). From the above measurement results, the degree of water-swellability is calculated by the following formula:

Degree of water-swellability = $(W_1 - W_2)/W_2$

Accordingly, the degree of water-swellability is a numerical value showing how many times of water based on the fibers' own weight can be absorbed and retained by the fibers.

(2) Amount of carboxyl groups (m mol/g)

About one gram of thoroughly dried sample fiber is weighed accurately (X g). After 200 ml water is added to this sample, an aqueous 1N hydrocloric acid solution is added to adjust the pH to 2 while heating to 50° C. Then a titration curve is obtained in the usual way using an aqueous 0.1N caustic soda solution. From this titration curve, the amount of caustic soda solution consumed by the carboxyl groups is obtained (Y cc). From the result of the above measurement, the amount of the carboxyl groups is calculated by the following formula:

Amount of carboxyl groups = (0.1 Y/X)

If polyvalent cations are contained in the fiber, the above formula must be corrected by obtaining the amount of these cations in the usual way. In the case of obtaining the amount of acid-type carboxyl groups, the titration is carried out without previously regulating the pH to 2 with an aqueous 1N hydrochloric acid solution.

EXAMPLE 1

Four parts of AN fibers (single-fiber denier: 3 d; fiber length: 38 mm; inherent viscosity in dimethylformamide (DMF) at 30° C.: 1.3) consisting of 90% AN and 10% methyl acrylate (MA) was immersed into 96 parts of an aqeuous 30% caustic soda solution (7.5 mol/1000 g solution). The fibers were boiled under stirring for 2 minutes, and after removing remaining alkali from the fibers by water-washing, the fibers were dried to obtain water-swellable fibers (I) which were white or slightly yellowish. The fibers (I) thus obtained were insoluble in water and had a degree of water-swellability of 6 cc/g. When the fibers were squeezed in a water-swollen state through the hand, it was confirmed that the core portion composed of the AN polymer remained.

Fifty grams of the water-swellable fibers (I) was packed in a column (50 mm in inner diameter and 170 mm in height), and turbine oil (in a white and turbid state) containing 0.5% water in a dispersed state was introduced into the column at the rate of 50 ml/min. The operation of water removing treatment was continued for 10 hours.

During this operation, there was no pressure elevation due to gap clogging, and the operation was carried out smoothly. The turbine oil after passing through the column was transparent, showing that the water removal was carried out perfectly.

EXAMPLE 2

Five parts of bicomponent conjugated AN composite fibers (Japan Exlan Industry Co.; single-fiber denier 2.5 d; fiber length 51 mm) was immersed into 95 parts of an aqueous 10% caustic soda solution (2.5 mol/1000 g solution) coexisting with 20% sodium chloride (3.45 mol/1000 g solution). The solution was heated under stirring for 15 minutes. Then, after removing alkali remaining in the fibers by water-washing, the fibers were dried to obtain water-swellable fibers (II) which were white of slightly yellowish. The fibers thus obtained (Cn=12/25 mm Ci=20%) were insoluble in water, and had a core of the AN polymer. The fibers had a degree of water-swellability of 6.5 cc/g.

The water-swellable fibers (II), the water-swellable fibers (I) produced in Example 1, and for comparison, moistureabsorbing polyester fibers (Toyobo Co. Ltd.; trade name Escot), craft pulp, granular hydrogel (degree of water-swellability 10 cc/g), zeolite, and silica gel were measured for their water-removing power according to the procedure described in Example 1. The particle diameter of the granular hydrogel, zeolite and silica gel was 14 to 30 mesh.

The measurement results are shown in Table 1.

TABLE 1

| Kind of water-removing material | A Packed amount (g) | Treatable* capacity of oil (liters) | B Amount of water removed (g) | B/A** Water removing power (times) |
|---|---|---|---|---|
| Fibers (II) | 50 | 45 | 205 | 4.1 |
| Fibers (I) | 50 | 35 | 160 | 3.2 |
| Moisture absorbing polyester | 50 | 8 | 35 | 0.7 |
| Craft pulp | 50 | 15 | 65 | 0.3 |
| Granular hydrogel | 250 | 3 | 13 | 0.05 |
| Zeolite | 270 | 24 | 110 | 0.4 |
| Silica gel | 260 | 18 | 80 | 0.3 |

*Treatable capacity of oil (liters) = The amount of the turbine oil that has passsd through the column until the water content in the oil has become the same as the content (0.5%) in the untreated oil (or until the water-removing material has lost its water-removing power).
**Water-removing power (times) = A measure showing how many times of water, based on the weight of the water-removing material, can be removed.

From the results in Table 1, it is clearly understood that the water-swellable fibers (I) and (II) according to the present invention show an outstanding excellence in water-removing power over all of the comparative samples, even if compared in the amounts of water removed, which leave the packing amounts out of consideration. It is also seen that, among others, the power of the water-swellable fibers (II) having crimps is particularly excellent.

In the case of the granular hydrogel, after continuing the operation for one hour, the pressure elevated rapidly owing to the gap clogging, and therefore the operation had to be stopped.

EXAMPLE 3

The monocomponent AN fibers in Example 1 were mechanically crimped (Cn=9.0, Ci=10.0). The thus-crimped fibers were subjected to the hydrolytic treatment described in Example 1 to obtain water-swellable fibers (III) having crimps (Cn=9.0, Ci=9.8). The fibers (III) were insoluble in water and had a core portion of the AN polymer. The water-swellability of the fibers (III) was 6 cc/g.

The water-removing power of the fibers (III) was measured according to the procedure described in Example 1. It was observed that the fibers (III) had a treatable capacity of 41 liters of the oil, and had a water-removing power of 3.7 times.

EXAMPLE 4

The bicomponent conjugated AN composite fibers described in Example 2 were boiled for 4 minutes in a 30% aqueous caustic soda solution, while the fibers were maintained under a tension which gave a Ci of 13% to obtain fibers (IV) having a degree of water-swellability of 19 cc/g.

The fibers (IV, Cn=11.0, Ci=13.0) and the monocomponent AN fibers described in Example 3 (but the fiber length was 51 mm) were carded at a mixing ratio of 30/70. The water-removing power of the resulting web was measured according to the procedure described in Example 1.

This water-removing material was able to treat 40 liters of the oil, and had a water-removing power of 3.6 times.

EXAMPLE 5

The monocomponent AN fibers described in Example 3 were hydrolyzed according to the recipe described in Example 2 (but the treating temperature was 105° C.) to produce fibers (V) (Cn=9.0, Ci=9.6) having a degree of water-swellability of 78 cc/g.

The fibers (V) and the composite fibers described in Example 2 (but the fiber length was 38 mm; Cn=11.0, Ci=14) were carded at a mixing ratio of 10/90. The water-removing power of the web thus obtained was measured according to the procedure described in Example 1. This water-removing material was able to treat 37 liters of the oil and had a water-removing power of 3.6 times.

EXAMPLE 6

The composite fibers described in Example 2 (but the fiber length was 5 mm) were hydrolyzed according to the recipe described in Example 1 (but the temperature×time=100° C.×10 minutes) to produce fibers (VI) (Cn=13.0, Ci=29.0) having a degree of water-swellability of 31 cc/g.

The water-removing power of the fibers (VI) thus obtained was measured according to the procedure described in Example 1 (but the amount of the fibers packed was 10 g, and the introduction rate of the turbine oil was 10 ml/minutes).

This water-removing material was able to treat 12 liters of the oil, and had a water-removing power of 5.4 times.

EXAMPLE 7

A woolen type regular yarn having a metric count of ⅛ composed of 40 parts of AN fibers (single-fiber denier 5d; fiber length 76 mm) produced from 90% AN and 10% methyl acrylate, and 60 parts of said AN fibers (but the single-fiber denier was 7d), was sprinkled uniformly with a 30% aqueous caustic soda solution so that the yarn could hold 20% of the solution based on the weight of the yarn. This yarn was then placed in an autoclave, and was heated in saturated steam for 5 minutes. Thereafter, the yarn was removed from remaining alkali was removed from the yarn by water-washing, and the yarn was dried. In this way, a yarn (VII) composed of white or slightly yellowish water-swellable fibers was obtained.

The fibers obtained by opening the thus-obtained yarn (VII) were insoluble in water, and when the fibers were squeezed through the hand in a water-swollen state, it was observed that the core portion of the AN polymer remained, and only the outer layer of the treated fibers was hydrogelled. The fibers (VII) contained 0.4 m mol/g of (—COONa) groups, and had a water-swellability of 6 cc/g.

This yarn was wound around an internal tubular support (30 mm in diameter and 247 mm in length) at a density of 0.25 g/cm³ until the diameter reached 70 mm to produce a filter.

A water-removing apparatus equipped with this filter was connected with a vessel containing 150 liters of turbine oil (turbid white) in which 0.2% water had been mixed and dispersed, and water-removing treatment was carred out so that said oil could recycle through said water-removing apparatus at a rate of one liter/minute.

During this operation, there was no pressure elevation due to the gap clogging and the operation continued in a satisfactory condition. After the turbine oil was recycled through the water removing apparatus two times or more, the oil became transparent (water content less than 0.02%), and it was confirmed that the water removal was perfect.

EXAMPLE 8

A worsted type bulky yarn having a metric count of 2/5 composed of 60% of bicomponent conjugated AN composite fibers (Japan Exlan Industry Co.; single-fiber denier 6d; varicut) and 40% of the AN fibers (5d; varicut and bulky) described in Example 7, was alkali-treated according to the recipe described in Example 1 to produce a yarn (VIII) composed of water-swellable fibers.

The fibers obtained by opening this yarn (VIII) were insoluble in water, and the core portion of the AN polymer remained. Said fibers had a degree of water-swellability of 6 cc/g.

A filter was produced from this yarn (VIII) in the same way as in Example 7. The amount of water removed (g) was measured, and it was confirmed that it had absorbed and removed 340 g water.

As regards the measurement of the amount of water removed (g), the oil was recycled through the water removing apparatus as in Example 7, with the difference that, after the oil had passed through the apparatus two times, the recycling of the oil was continued while water was added to the oil until the oil lost its transparency. The total amount of water removed was thus obtained.

EXAMPLE 9

30 parts of cotton, a cotton spinning type bulky yarn having a metric count of 2/30 consisting of 30 parts of the AN fibers described in Example 7 (but 1.5d×38 mm) and 40 parts of said AN fibers (but 2d×38 mm, bulky), was alkali-treated according to the recipe described in Example 7 to obtain a yarn (IX) containing water-swellable fibers, and thereafter a filter was produced from this yarn.

The amount of water removed by this filter was 300 g. The water-swellability of the yarn (IX) was 4.5 g/cc.

EXAMPLE 10

An aqueous 10% caustic soda solution coexisting with 20% sodium nitrate was sprinkled uniformly on the AN fibers described in Example 8 so that the fibers could hold 30% of the solution based on the weight of the fibers. The fibers were then put into an autoclave and were heated in saturated steam at 115° C. for 10 minutes. Thereafter, the remaining alkali was removed from the fibers by washing with water, and the fibers were dried to produce white or slightly yellowish water-swellable fibers. The fibers thus obtained had a core portion of the AN polymer, contained 1.6 m mol/g —COONa groups and had a degree of water-swellability of 85 cc/g.

From 10% of said fibers and 90% of polyester fibers (3d×79 mm), a woolen type mixed yarn (X) having a metric count of ⅛ was obtained. The amount of water that could be removed by a filter made of this yarn (X) (winding density 0.2 g/cm³) was 250 g.

EXAMPLE 11

A 30% aqueous caustic soda solution was sprinkled uniformly on bicomponent conjugated AN composite fibers previously opened (Japan Exlan Industry Co.; single-fiber denier 6d; fiber length 5 mm) so that the fiber could hold 20% of the solution based on the weight of the fibers. Then the fibers were placed in an autoclave and were heated in saturated steam at 105° C. for 5 minutes.

The thus-obtained fibers (1) were water-insoluble. When the fibers were squeezed in a water-swollen state through the hand, a core portion of the AN polymer remained, and it was confirmed that only the outer layer of the fibers (1) was hydrogelled. The fibers (1) contained 0.4 m mol/g —COONa groups and had a degree of water-swellability of 7.0 cc/g.

The fibers (1) were dispersed in water and were acid-treated by adjusting the pH of the water to 3.5 with nitric acid. Then the fibers were dehydrated in a centrifuge until the water content reached 20%. It was found that 90% of the carboxyl groups of the fibers had been converted into acid-type.

The fibers obtained in this way were placed in a shaping vessel and were shaped under compression into a tube so that the tube could have a packing density of 0.18 g/cm$^3$, an inner diameter of 32 mm, an outer diameter of 180 mm, and a height of 150 mm. Then a mixed solvent composed of methanol and water (in the ratio of 80/20) containing 0.1% caustic soda was introduced into the shaping vessel to neutralize the fibers. Thereafter, the tube was washed with a mixed solvent of methanol and water (80/20), and subsequently it was dried by a hot air current at 60° C.

The tubular filter(XI) thus produced was mounted in a water-removing apparatus, and turbine oil (turbid white) in which 0.3% water has been dispersed was supplied to said water-removing apparatus at the rate of 1000 ml/min., with the oil under treatment being caused to pass from the outer side to the inner side of the filter. This water-removing operation was continued for 10 hours.

During this operation, there was no pressure elevation due to the gap clogging, and the operation was continued satisfactorily. The purified oil was transparent, and therefore perfect removal of water was confirmed. On examining the filter after use, no deterioration of the fibers and no deformation of the filter were observed.

EXAMPLE 12

A 10% aqueous caustic soda solution in which 20% sodium sulfate coexisted was sprinkled uniformly ion each of the AN composite fibers described in Example 11, monocomponent AN fibers given mechanical crimps (AN content=90%, single-fiber denier=6d; fiber length=5 mm; Cn=9.0/25 mm; Ci=10.0%), and the latter AN fibers without mechanical crimps, so that each of these fibers could hold 30% of the solution based on the weight of the fibers. Then these fibers were heated in an autoclave at 115° C. in saturated steam for 4 minutes to produce water-swellable fibers (2, 3 and 4). After acid treatment, about 90% of the carboxyl groups of these fibers were converted into acid-type, respectively.

From these three kinds of fibers (2-4), three kinds water-removing filters (XII-XIV) were produced according to the procedure described in Example 1. Using these three kinds of water-removing filters (XII-XIV) and the water-removing filter (XI) produced in Example 11, water removing operation was carried out in the same way as described in Example 11.

The results are shown in Table 2.

TABLE 2

| Filter no. | Degree of water-swellability (cc/g) | Amount of —COONa groups (m mol/g) | Treatable* capacity of oil (liters) | Amount of removed water (g) |
|---|---|---|---|---|
| XI | 7.0 | 0.4 | 660 | 1600 |
| XII | 6.8 | 0.4 | 640 | 1550 |
| XIII | 7.2 | 0.4 | 600 | 1450 |
| XIV | 6.5 | 0.3 | 480 | 1160 |

*Treatable capacity of oil (liters) = The amount of the turbine oil that has passed through the filter until the water content in the oil has become the same as the content (0.3%) in the untreated oil (or until the filter has lost its water-removing power).

From the results in Table 2, it is clearly understood that the filters of the present invention have excellent water-removing power, and that among others, the water-removing filters (XI-XIII) produced from the water-swellable fibers having crimps (1-3) are particularly excellent.

For comparison, the water-removing properties of craft pulp was determined in the same way as above, but they were extremely poor, the treatable capacity of oil being 250 liters, and the amount of removed water being 610 g.

EXAMPLE 13

The AN composite fibers described in Example 11 (but 2.5d×10 mm) were subjected to hydrolytic treatment according to the procedure described in Example 11 (but 115° C.×7 minutes) to produce fibers (5) containing 1.4 m mol/g —COONa groups and having a degree of water-swellability of 43 cc/g.

Twenty percent of the fibers (5) and 80% of polyester fibers (3d×10 mm) were mixed and opened. From this mixture, a water-removing filter (XV) packing density 0.2 g/cm$^3$) was produced according to the recipe described in Example 1. Using this filter, water-removing treatment was performed in the same way as in Example 11 (except that the supply rate of the oil was 500 ml/min.) to determine its water-removing properties, which were found to be very good, the treatable capacity of oil being 620 liters and the amount of removed water being 1410 g.

What is claimed is:

1. A tubular water-removing filter usable for removing water from hydrophobic liquids, comprising an internal tubular support having a plurality of perforations, and, wound around said tubular support, a fiber assemblage containing multi-layer water-swellable fibers, at least a part of the fiber outer layer of each of said multi-layer water-swellable fibers being made up of a hydrophilic, cross-linked polymer, and the remainder of each of said multi-layer water-swellable fibers being made up of an acrylonitrile polymer and/or another polymer, with the proviso that said fiber assemblage has a degree of water-swellability of 2-100 cc/g.

2. The water-removing filter as claimed in claim 1 wherein the fiber assemblage is in the form of a yarn.

3. The water-removing filter as claimed in claim 1 wherein the fiber assemblage has a winding density within the range of from 0.1 to 0.6 g/cm$^3$.

4. The water-removing filter as claimed in claim 1 wherein the ratio of the diameter to height of the filter is within the range of from 1:0.5 to 1:20.

5. A tubular water-removing filter produced by compression shaping a fiber assemblage, said fiber assemblage containing multi-layer water-swellable fibers, at least a part of the fiber outer layer of each of said multi-layer water-swellable fibers being made up of a hydrophilic, cross-linked polymer, and the remainder of each of said multi-layer water-swellable fibers being made up of an acrylonitrile polymer and/or another polymer, said multi-layer water-swellable fibers containing, combined therewith, 0.1–4.0 m mol/g of salt-type carboxyl groups (—COOX) wherein X is an alkali-metal or ammonium, with the proviso that said fiber assemblage has a degree of water-swellability of 2–100 cc/g.

6. The water-removing filter as claimed in claim 5 wherein the filter assemblage has a packing density within the range of from 0.1 to 0.6 g/cm$^3$.

7. The water-removing filter as claimed in claim 5 wherein the ratio of the diameter to height of the filter is within the range of from 1:05 to 1:10.

8. A process for producing a water-removing filter, which comprises providing a fiber assemblage containing multi-layer, latently water-swellable fibers, at least a part of the fiber outer layer of each of said multi-layer fibers being made up of a hydrophilic, cross-linked polymer, and the remainder of each of said multi-layer fibers being made up of an acrylonitrile polymer and/or another polymer, said multi-layer fibers containing, combined therewith, 0.1–4.0 m mol/g of carboxyl groups, at least a part of said carboxyl groups being acid-type carboxyl groups (—COOH), shaping said fiber assemblage into a tube by compression, and neutralizing and drying said tube in a non-swollen state.

9. The process as claimed in claim 8 wherein at least 10 mol % of the carboxyl groups are acid-type carboxyl groups.

10. The process as claimed in claim 8 wherein the fiber assemblage to be shaped has a water content less than 100%.

11. The process as claimed in claim 8 wherein the fiber assemblage is shaped by compression so that the packing density of said fiber assemblage is within the range of from 0.1 to 0.6 g/cm$^3$.

12. The process as claimed in claim 8 wherein the fiber assemblage is shaped by compression so that the tube has a ratio of the diameter to height within the range of from 1:0.5 to 1:10.

* * * * *